Aug. 13, 1929.
O. DOMRIES
1,724,646
RIDGING AND BLOCKING MACHINE
Filed April 4, 1928   3 Sheets-Sheet 2
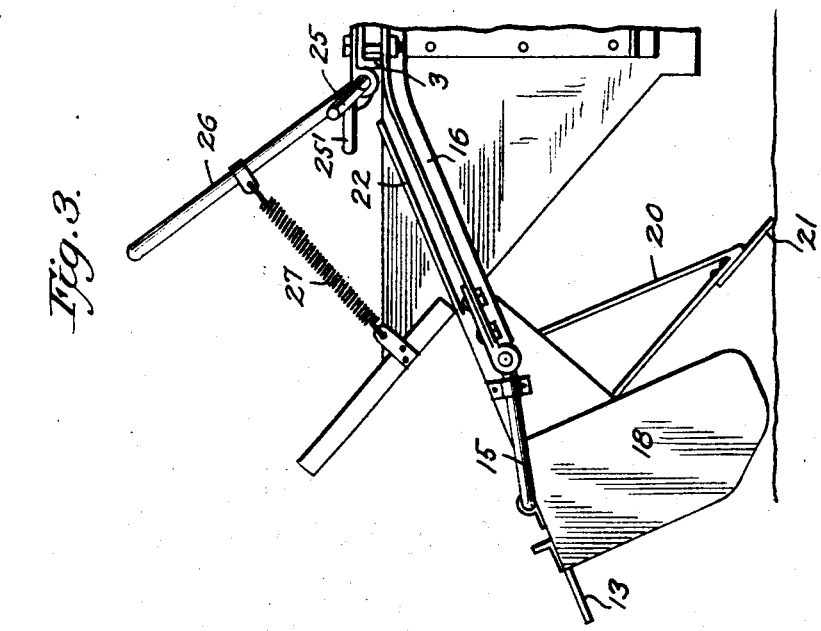
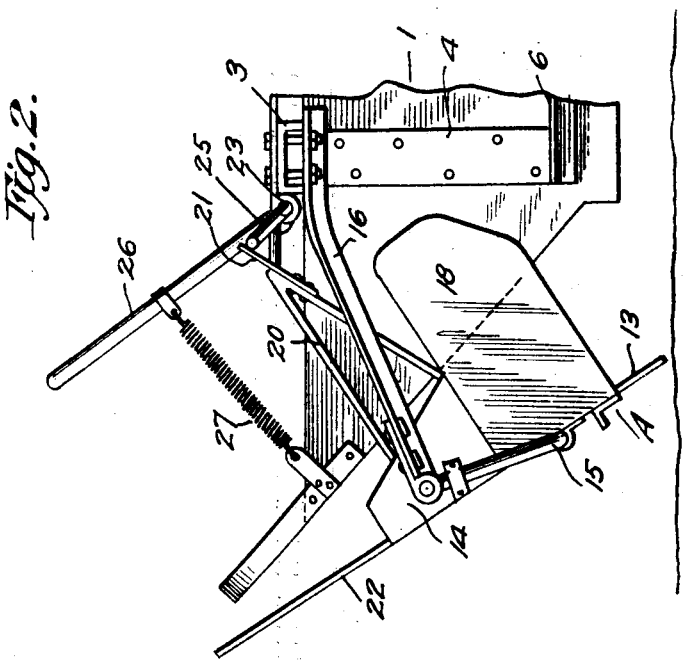
Otto Domries
INVENTOR
BY Victor J. Evans
ATTORNEY Patented Aug. 13, 1929.

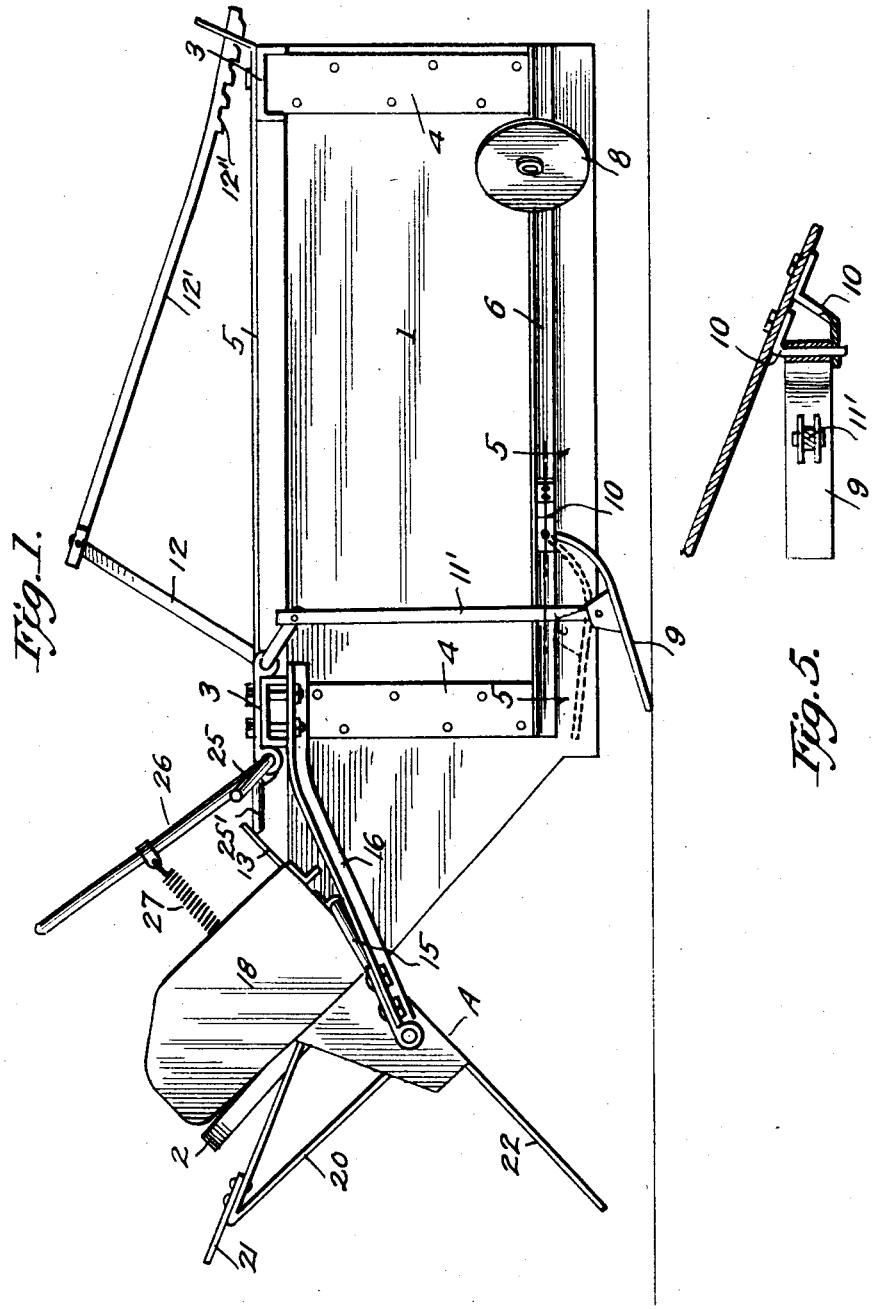

1,724,646

UNITED STATES PATENT OFFICE.

OTTO DOMRIES, OF ANAHEIM, CALIFORNIA.

RIDGING AND BLOCKING MACHINE.

Application filed April 4, 1928. Serial No. 267,354.

This invention relates to a ridging and blocking machine, mainly designed for preparing land for irrigation purposes, the general object of the invention being to provide improved means for controlling the operation of the dumping scrapers which are placed one at each side of the pair of main blades.

Another object of the invention is to provide means for controlling the depth the blades enter the soil and also for raising the device into inoperative position when desired.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of the device, showing the same raised into inoperative position, with the dumping scrapers in idle position.

Figure 2 is a view showing the dumping scrapers in loading position.

Figure 3 is a view showing the dumping scrapers in unloading position and moving back to idle position.

Figure 5 is a section on line 5—5 of Figure 1.

Figure 4:
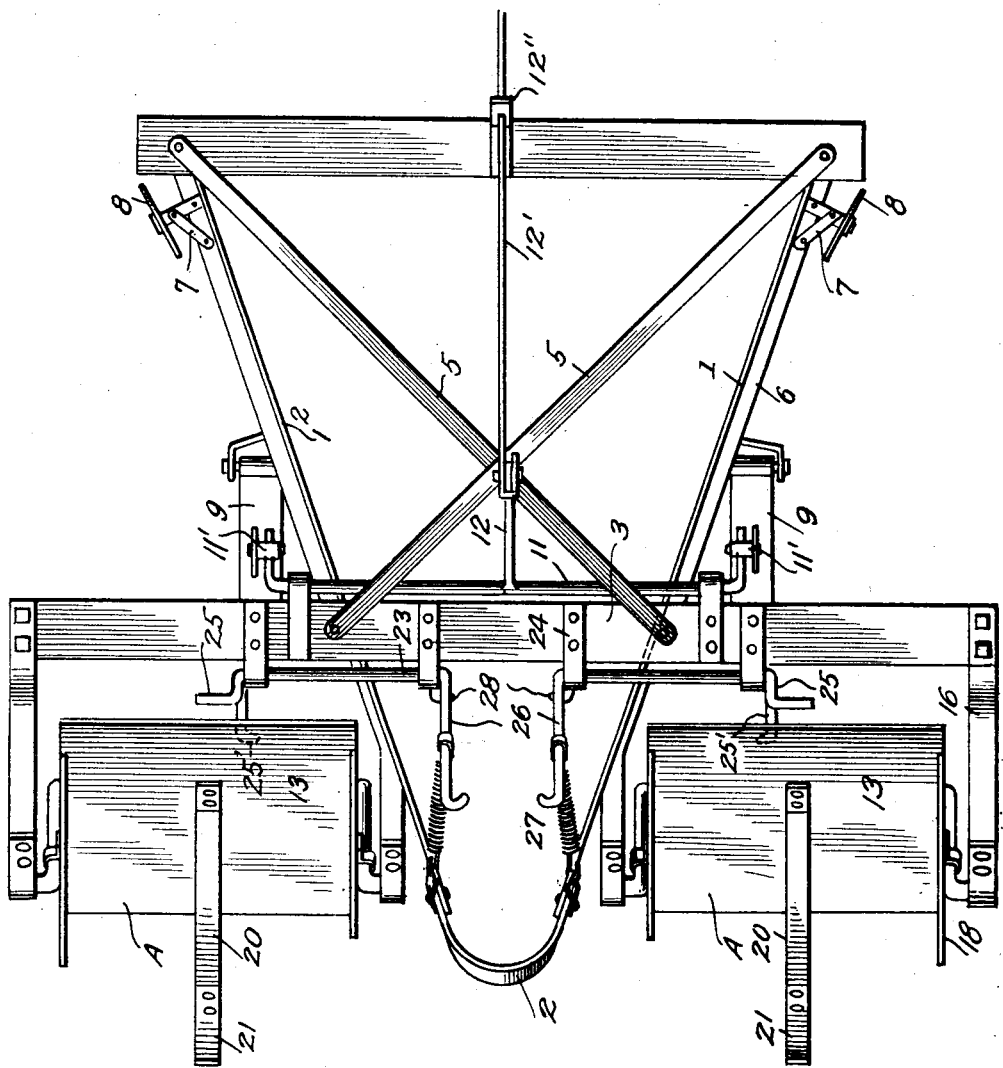
Figure 4 is a plan view.

In these views, the numeral 1 indicates the pair of main blades which are arranged in convergent relation to form a ridge between the ditches being formed by the blades, the rear ends of the blades being tapered upwardly and having their pointed rear ends connected together by the loop 2. Channel irons 3 are fastened to the reinforcing members 4 at the front and rear ends of the blades and braces 5 connect the two channel irons together.

A reinforcing angle iron 6 is fastened to the outer face of each blade adjacent its lower edge. A bracket 7 is connected to each angle iron adjacent its front end and these brackets carry the disks 8 which act to push back the earth falling into the furrows. A shoe 9 is pivotally arranged on each member 6 an appreciable distance from its rear end through means of the brackets 10.

A crank shaft 11 is rotatably connected to the rear member 3 and has its cranks which are arranged at its ends, connected by the links 11' with the shoes so that when the shaft is rocked, the shoes will be raised or lowered according to the direction of rotary movement of the shaft. Said shaft is provided with a centrally arranged arm 12 to which a bar 12' is connected, this lever having a handle on its front end so that it can be moved to rock the shaft through means of the arm 12. The bar is held in adjusted position by the ratchet means 12" at the front end of the machine. Thus the shoes can be adjusted so that they will act as runners to hold the rear part of the device off the ground so that the device can be moved from place to place when the parts thereof are idle. The runners can also be adjusted to cause the blades to enter the ground at any desired depth so that the device can be used in various kinds of soils.

The dumping scrapers are shown at A, these scrapers being arranged at the rear of the device and they act to widen the ditches formed by the main blades and they also act to form blockades across the ditches. Each dumping scraper comprises a blade 13 having the wings 14 connected with its side edges, and the crank shaft 15 which is connected with the rear face of the blade and has its upwardly extending portions fastened to the wings 14, the extremities of the shaft being journaled in the ends of the beams 16 which are connected with the rear channel iron 3. A guard 18 is connected with the outer edge of each blade to keep the earth from falling back into the furrow and this guard also acts as a tread in assisting in turning the blade. The form of the shaft and the position of its bearings in the beam 16 permits the blade to rotate about a horizontal axis which is slightly offset from the blade.

A substantially V-shaped bracket 20 is connected with the central part of the upper portion of the blade and has a tongue 21 on its outer end. An arm 22 is connected with the top of the blade at the center thereof.

A pair of shafts 23 is journaled in the brackets 24 carried by the rear channel member 3, each shaft having the cranks 25 and 25' at its outer end and a hand lever 26 is connected with the inner end of each shaft for rocking the shaft. A coil spring 27, having one end connected with the lever, and its other end to the rear end of a stationary blade, acts to hold the lever in rearward position with a part thereof resting against a stop 28 formed on a bracket 24. This position of the lever will hold the shaft 23 with its cranks 25 and 25' in a rearward position, so that the crank 25 will be engaged by the tongue 21 and the crank 25' will be engaged by the front edge of the scraper during the rotary movement of the scraper. The arm 22 will not engage either crank as it is of such a length as to miss the crank 25 and the crank 25' is arranged out of the path of travel of said arm 22.

From the foregoing it will be seen that when the tongue 21, carried by the bracket 25, rests against crank 25 of shaft 23, the blade is held in loading or scraping position, as its cutting edge will penetrate the soil and thus act to widen the ditch made by the stationary blade 1. Then when the ditch is to be blockaded, the operator shoves the lever 26 forwardly so as to move the crank 25 out of engagement with the tongue 21. Then the blade will turn on its axis due to the resistance of the dirt and to the fact that there is nothing to prevent said blade from turning and as the blade turns, its lower edge will leave the dirt and then the end of the guard 18 will engage the soil, which acts as a tread to give the blade a further turning movement and then the tongue 21 will engage the soil so that this tongue acts as a tread to give the blade a further turning movement which terminates when the edge of the blade engages the crank 25', as shown in Figure 1.

As before stated, the arm 22 will not engage the cranks and, therefore, said arm will not prevent the turning movement of the blade. This arm acts as a tread when the blade is in idle position, as shown in Figure 1. Thus the dirt carried by the blade will be dumped to form a blockade in the ditch and the blade will be moved to idle position. After the device passes the blockade, the operator again moves the lever forwardly to move the crank 25' out of engagement with the blade and this will cause the blade to drop into operative position, due to the weight of the parts and also to the fact that the arm 22 is in engagement with the ground.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. In a ridging and blocking machine, a pair of dumping scrapers rotatably arranged at the rear of the machine, a pair of crank shafts journaled in the rear of the machine, a pair of cranks on the outer end of each shaft, a lever for moving each shaft, one crank of each shaft engaging the blade of each scraper for holding the scraper in idle position, a projection extending from the upper end of the face of the blade of each scraper for engaging the other crank of each shaft to hold the scraper in loading position, the cranks being moved out of engagement with the blade and the projection when the shaft is rocked by the lever, tread forming portions on each scraper for assisting the projection in rotating the scraper, one of the tread forming portions also acting as a guard to prevent earth falling into the furrow made by the scraper.

2. In a ridging and blocking machine, a pair of dumping scrapers rotatably arranged at the rear of the machine, a pair of crank shafts journaled in the rear of the machine, a pair of cranks on each shaft, a lever for moving each shaft, one crank of each shaft engaging the blade of each scraper for holding the scraper in idle position, a projection extending from the upper end of the face of the blade for engaging the other crank of each shaft to hold the scraper in loading position, the cranks being moved out of engagement with the blade and the projection when the shaft is rocked by the lever, tread forming portions on each scraper for assisting the projection in rotating the scraper, one of the tread forming portions also acting as a guard to prevent earth falling into the furrow made by the scraper and spring means for holding each lever and shaft with the cranks in the paths of the projection and blade.

3. In a ridging and blocking machine, a dumping scraper comprising a single blade, a crank shaft connected with the rear of the blade, rearwardly extending beams having bearings at their rear ends for the extremities of the shaft, a shaft journaled in the rear part of the machine and having a pair of cranks thereon, a spring controlled lever for rocking the second shaft, one crank engaging a part of the blade of the scraper for holding the scraper in idle position, a forwardly extending bracket at the top of the blade having a part thereon for engaging the second crank to hold the scraper in loading position, a guard connected with the outer edge of the blade for preventing dirt from falling into the furrow and also acting as a tread to assist the forward part of the bracket in rotating the blade and an upwardly extending arm on the upper end of the blade also acting as a tread.

4. In a ridging and blocking machine, a pair of dumping scrapers rotatably arranged at the rear of the machine, a pair of crank shafts journaled in the rear of the machine, a pair of cranks on each shaft, a lever for moving each shaft, one crank engaging a part of the blade of each scraper for holding the scraper in idle position, a projection extending from the upper end of the face of the blade for engaging the second crank to hold the scraper in loading position, the cranks being moved out of engagement with the parts when the shaft is rocked by the lever, tread forming portions on each scraper for assisting the projection in rotating the scraper and means for elevating the rear part of the machine for moving the parts into inoperative position.

5. In a ridging and blocking machine, a pair of dumping scrapers rotatably arranged at the rear of the machine, a pair of crank shafts journaled in the rear of the machine, a pair of cranks on each shaft, a lever for moving each shaft, one crank engaging the blade of each scraper for holding the scraper in idle position, a projection extending from the upper end of the face of the blade for engaging the other crank to hold the scraper in loading position, the cranks being moved out of engagement with the parts when the shaft is rocked by the lever, tread forming portions on each scraper for assisting the projection in rotating the scraper and means for elevating or partly elevating the rear of the machine for moving the scraper parts into inoperative position and for controlling the depth of cut.

6. In a ridging and blocking machine, a pair of dumping scrapers rotatably arranged at the rear of the machine, a pair of shafts journaled in the rear of the machine, a pair of cranks on each shaft, a lever for moving each shaft, one crank of each shaft engaging the blade of each scraper for holding the scraper in idle position, a projection extending from the upper end of the face of the blade for engaging the other crank to hold the scraper in loading position, the cranks being moved out of engagement with the parts when the shaft is rocked by the lever, tread forming portions on each scraper for assisting the projection in rotating the scraper, means for elevating or partly elevating the rear of the machine for moving the scraper parts into inoperative position and for controlling the depth of cut, such means comprising a shoe at each side of the device forming a runner and lever means for holding the shoe in either its lowest position, an intermediate position or fully raised position.

In testimony whereof I affix my signature.

OTTO DOMRIES.